Oct. 13, 1964 E. H. HANDLER 3,152,779
ZERO-LENGTH LAUNCHING DEVICE FOR PILOTED
AND UNPILOTED WATER-BASED AIRCRAFT
Filed Nov. 14, 1962 2 Sheets-Sheet 2
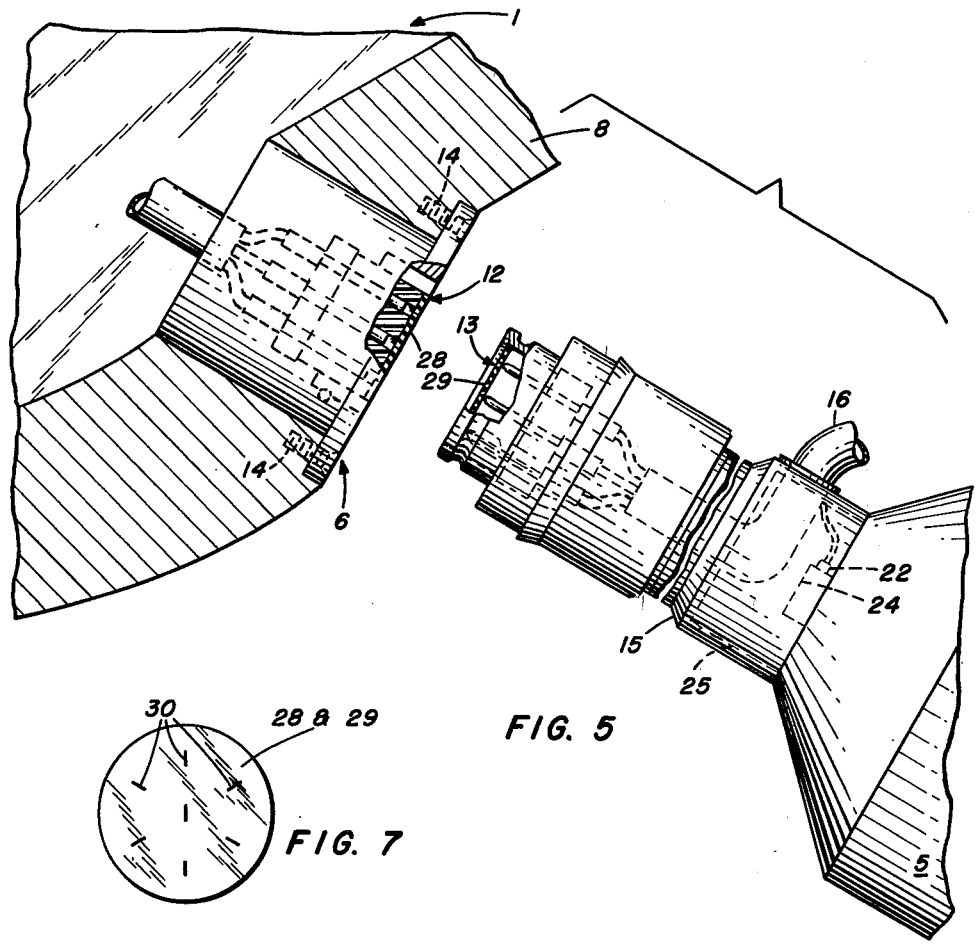
FIG. 5
FIG. 7
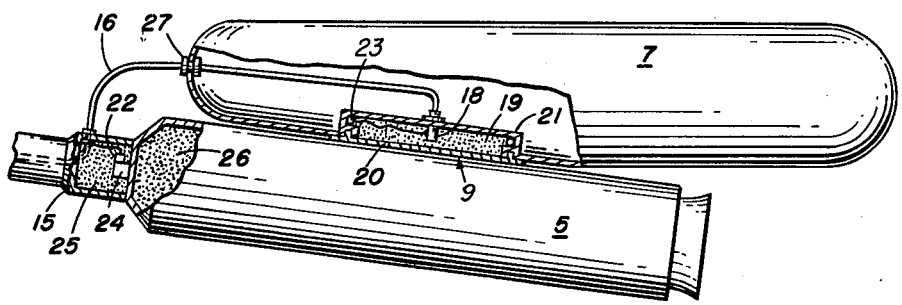
FIG. 6

Oct. 13, 1964

E. H. HANDLER 3,152,779

ZERO-LENGTH LAUNCHING DEVICE FOR PILOTED AND UNPILOTED WATER-BASED AIRCRAFT

Filed Nov. 14, 1962

INVENTOR
EUGENE H. HANDLER

BY Claude Funkhouser
Thomas H. Webb
ATTORNEY
AGENT

United States Patent Office 3,152,779
Patented Oct. 13, 1964

3,152,779
ZERO-LENGTH LAUNCHING DEVICE FOR PILOTED AND UNPILOTED WATER-BASED AIRCRAFT
Eugene H. Handler, 4217 Brookfield, Kensington, Md.
Filed Nov. 14, 1962, Ser. No. 237,774
5 Claims. (Cl. 244—63)
(Granted under Title 35, U.S. Code (1952), sec. 266)

The invention described herein may be manufactured and used by or for the Government of the United States of America for governmental purposes without the payment of any royalties thereon or therefor.

This invention relates to apparatus for zero-length take-off or launching of high performance piloted or unpiloted water-based aircraft. More particularly, the invention relates to apparatus for facilitating a take-off of an aircraft having a fuselage configuration similar to a land-based aircraft. It is particularly advantageous for high performance jet propelled aircraft.

Prior art techniques for assisting in shortening the take-off runs of aircraft have incorporated JATO type rockets which are disposed along the fuselage or adjacent thereto or under the wing structure for adding impetus to the take-off of the aircraft. Immediately following take-off, when the aircraft is airborne, the exhausted housing of the JATO units are released by suitable jettisoning structures well known in the art. The use of JATO apparatus for sea planes facilitates a shorter take-off run than that characterized by the absence of such JATO units. This type of take-off still requires that the aircraft utilize a conventional sea plane hull with a V-bottom configuration including such structural elements as chines, steps along the hull, etc. Alternative prior art methods of attempting to facilitate launching of aircraft from the surface of the water have utilized sleds or the like such as that shown in U.S. Patent 2,331,837 to F. W. King. JATO arrangement of the prior art are shown for example in U.S. Patent 2,506,976 to A. Tharratt and U.S. Patent 2,833,494 to S. R. Parker et al. The foregoing patents are mentioned merely as examples of take-off concepts of the character known to the prior art, and with respect to which, the instant invention provides improved techniques for seaplane type aircraft take-off.

This invention contemplates the utilization of a solid propellant rocket structure which is disposed rearward and below the tail portion of an aircraft of the character having a high performance fuselage configuration. When the aircraft is at rest on the surface of the water its fuselage is normally disposed in a generally horizontal, slightly submerged position in the water. The rocket utilized for zero-length launching is attached to the under side of the rear portion of the fuselage. The mass of the launching rocket functions to effect a displacement of the center of gravity of the aircraft when it is attached at the desired location to the aft of the lower tail portion of the aircraft. The turning movement resulting from the attachment to the aircraft of the additional mass of the rocket tends to cause it to assume a new orientation with the fuselage axis disposed along a more nearly vertical line of inclination with respect to the plane of the surface of the body of water. In order to prevent this change of aircraft position at all times other than immediately prior to take-off, a suitable float structure hereinafter to be described in greater detail is incorporated in adjacency to the rocket structure to render the combination substantially neutrally or slightly positively buoyant. The utilization of the float and rocket combinations effects substantially no alteration in the horizontal position of the aircraft due to this slight change or displacement of the center of moment of the aircraft. The center of gravity of the aircraft considered in a longitudinal sense along the axis of the fuselage is thus substantially unaltered at all times until just immediately prior to the time of take-off.

Immediately prior to take-off the float is released and may be permitted to float away on the surface of the body of water where it may be retrieved by a nearby tending vessel. In the event the tending vessel has left the vicinity of the aircraft prior to the time of take-off and if it be desired to hide any evidence of the prior presence of the aircraft, the float may be explosively destroyed or sunk by any suitable arrangement whereby its surface is punctured to facilitate its sinking below the surface of the water.

At the time of take-off after the float has been released, the aircraft rotates to a nose-high attitude with the rocket submerged. This funcions to cause the aircraft to assume a more nearly vertical disposition in the water. It is to be understood that the center of gravity along the lateral or transverse axis of the fuselage remains unchanged. It is to be further understood that the rocket is so disposed as to maintain unaltered, the axis of thrust of the aircraft due to the combined effect of the rocket and the aircraft's power plants. The thrust line of the rocket thus passes through the center of gravity of the aircraft. The rocket is thereafter fired in the water and assists the aircraft to make a zero-length substantially more nearly vertical take-off. Subsequent to the aircraft becoming airborne the rocket booster is jettisoned and the aircraft is permitted to assume its normal flight configuration.

It is a feature of this invention to provide a capability for launching or take-off of a piloted or unpiloted aircraft from the surface of a body of water wherein the aircraft fuselage configuration is possessed of high performance characteristics such as that of land based aircraft.

One object of this invention resides in the provision of a jettisonable rocket which will function to dispose the tail of an aircraft below the surface of the water for a high vertical angle take-off.

Another object of the invention resides in the utilization of one or more rocket propellant charges for jet assisted take-off, wherein the rocket or rockets may be advantageously positioned in a manner to effectuate a reorientation of the aircraft prior to take-off to a more nearly vertically disposed position and wherein the aircraft is permitted to reestablish its orientation to that most desirable for normal flight by the jettisoning of the booster structure substantially immediately after the aircraft is airborne.

In correlation with the foregoing object it is a further object to provide a float structure for releasable attachment to a booster at the tail portion of the aircraft chiefly in order to compensate for the negative buoyancy characteristics of the booster which is utilized for submerging the tail portion of the aircraft for zero-length launching after the release of the float.

It is a further object of the invention to provide a float structure and rocket booster structure which are readily attachable to and detachable from the aircraft.

In correlation with the foregoing object it is a further object to provide an attachment means the release of which may be accomplished either from a location remote from the point of attachment thereof to the aircraft, or automatically.

Other objects and many of the attendant advantages of this invention will be readily apparent to one skilled in the art when considered with relation to the following detailed description when taken in conjunction with the accompanying drawings wherein:

FIG. 5 is a diagrammatic illustration of a rocket release mechanism of a character suitable for use with the instant invention; and FIG. 6 is a diagrammatic illustration of a release mechanism for the float and showing in fragmentary forms portions of the detonating means for accomplishing float separation;

FIG. 7 is an illustration of a perforated rubber diaphragm for purposes of water proofing the connector prior to assembly of the mating portion thereof.

Figure 1:
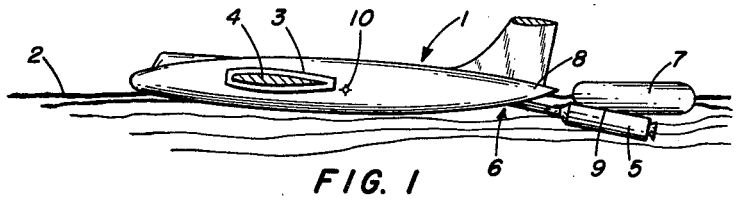
FIG. 1 is a diagrammatic illustration of an aircraft having a fuselage of a high performance characteristics configuration and shown with a float and rocket booster attached thereto when the aircraft is disposed at rest on the surface of a body of water.

Referring now to FIG. 1 of the drawings a generally conventional aircraft having a fuselage of character common to land-based craft is indicated generally at 1. The aircraft is disposed at rest on a surface of a body of water indicated at 2. The jet power plants for propulsion of the aircraft in normal flight are indicated generally at 3 and shown by way of illustration as being mounted on the wing structure of the aircraft 4 in a conventional manner. The rocket booster structure utilized for orienting the aircraft for zero-length launching is indicated at 5. The structural details hereinafter to be described in greater detail for attachment and separation of the booster 5 are indicated generally at 6. The float structure for compensating for the negative buoyancy of the rocket booster is indicated generally at 7 wherein it is disposed in intimate adjacency to the booster and rearwardly of the tail portion 8 of aircraft 1. The attachment of the float is by means of any suitable severable connection or the like whereby the float and booster may be initially attached to one another. The release of the float is accomplished by suitable release structure generally indicated at 9.

The location of the center of gravity of the aircraft when in flight is indicated generally by reference character 10.

Figure 2:
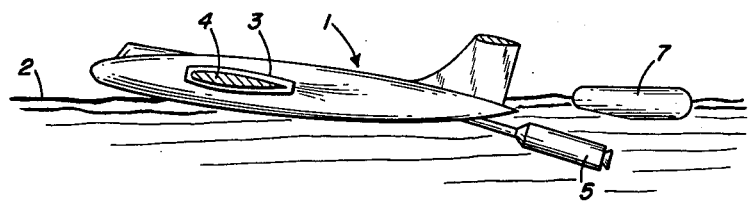
FIG. 2 is a view similar to FIG. 1 showing diagrammatically the position assumed by the aircraft at the instant of the detachment of the float from the aircraft and with the jet engines running prior to the assumption of the desired position for take-off.

Referring now to FIG. 2 it will be observed that the float 7 has been detached from the tail of the aircraft in order to permit the re-orientation of the aircraft prior to launching. The float as shown in FIG. 2 has not been ruptured and hence is shown as floating on the surface of the water.

Figure 3:
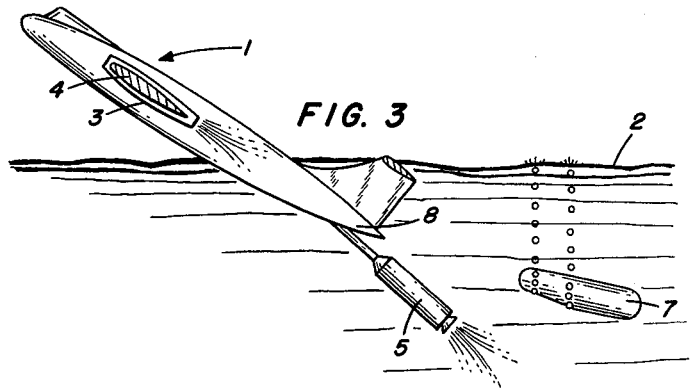
FIG. 3 is a diagrammatic illustration indicating the sinking of the float and the position of the jet aircraft at the instant of rocket firing.
Figure 4:
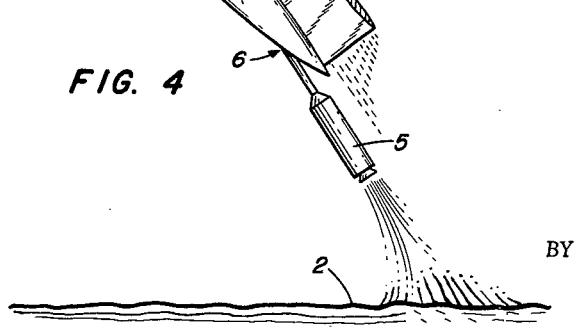
FIG. 4 is a view of the aircraft immediately after it has become airborne.

In the situation illustrated in FIG. 2, the center of gravity of the aircraft and the line of thrust of the combined booster propulsion unit and the jet power plants located on the aircraft wings is through the point indicated at 10 and in this illustration the jet engine has been started and the aircraft is changing position to that shown in FIG. 3 wherein the surfaces of the tail portion 8 are substantially under water. When the aircraft has assumed this position it is ready for take-off and the rocket 5 is fired from its underwater position. The propulsion effects of the rocket 5 and the jet engine produces a zero-length take-off whereby the aircraft achieves an airborne condition indicated in FIG. 4. Upon burnout of the rocket 5 the rocket booster is jettisoned by virtue of the structure hereinafter to be described and located generally as indicated at 6.

Referring now to FIG. 5 the booster 5 is provided with suitable connection means for making both an electrical and mechanical connection with the lower portion of the aircraft fuselage. This structure is generally indicated at 6. The female portion of the electrical connector is shown at 12 and the male portion at 13. The automatic release coupling forms no part of the instant invention. Hence details of this structure have not been illustrated herein. The connector may advantageously be of the character shown in U.S. Patent No. 2,735,993 which issued to Samuel A. Humphrey. With the modifications illustrated in FIG. 7 and located at 12 and 13 of FIG. 5 the structure generally may correspond to that of the Humphrey patent supra. The receptacle portion of the connector may be attached by screws attached at the flange portion 14. The plug portion is substantially similar to the plug portion of the Humphrey patent with the distinction that the body of the booster is connected at 15 in lieu of the clamp structure shown in the Humphrey patent. The design of the connector is designed to carry the mass of the booster and to provide a waterproof connection between the electrical connector elements disposed interiorly thereof. The electrical connections to the float 7 may be brought through the same cable connector elements 12 and 13 as for the booster 5 with a electrical control cable shown at 16 between from 15 to float 7. The electrical cable 16 extending between the booster and the float 7 enters the float at a grommet 27 which may advantageously be pulled out of the float after separation of the float proper from the booster. The electrical cable terminates in a squib or detonator 18 which is disposed in adjacency to an explosive charge 19. The detonator may be permanently attached to the interior of the float and the explosive charge of suitable energy value is disposed in a well provided in the surface of the float 7 wherein the explosive charge 19 may be inserted as a cast grain just prior to launching of the float. Alternatively if rupture of the flotation chamber of the float 7 is desired prima-cord may be inserted as indicated at 23. A suitable cover plate generally indicated at 20 and normally attached to the body of the booster 5 serves to retain the explosive charge in the well 21. The provision of the explosive charge will facilitate a separation of the float and booster whereas the prima-cord facilitates a sinking of the float immediately after release thereof and prior to launching a take off of the aircraft. The electrical cables may also be connected to a squib located generally at 22 to sever the cable 16 after the float detonator 18 has been fired. Alternatively the electrical connections to the float detonator 18 may be entirely enclosed within the housings of the booster and float and the burning of the booster charge for the propellent grain in the booster may be utilized by alteration of the point of attachment therebetween to burn the connecting cable 16 and the connecting portion of the float housing away as the booster is ignited. This will prevent the cable from flapping against the tail of the aircraft. This may be accomplished by a suitable electrical circuit closure within the aircraft whereby the igniter 24 and the booster are fired to ignite the booster charge 25 for the propellent grain 26.

It is to be further understood that in the event that it is not necessary or desirable to dispose of the float but to recover the same for utilization in reuse with other aircraft the separation may be accomplished by mechanical release devices of a character well known and the explosive charge 19 may be eliminated. In this event the cable utilized for the release device is severed at 22 by any suitable means when it is desired to make a take-off with the aircraft. This may be accomplished by either mechanical release, explosive burning of the cable or by an explosively driven chisel or cutting surface, the particular details of which form no part of the instant invention but the alternatives with respect to which will be obvious to those skilled in the art. In the event it is desired to render the respective parts of the cable connector waterproof prior to mating thereof suitable diaphragms 28 and 29 may be disposed across the faces of the respective parts as indicated at 12 and 13 and as shown in FIG. 7. These diaphragms will preferably be provided with minute slits 30 which are normally substantially closed but which will permit passage of the pins of the connector therethrough for mating engagement with the sleeve type contacts of the female connector portion of the coupling device.

It is also within the scope of the instant invention although less desirable to provide a tube structure within the aircraft with suitable means for extending the rocket therefrom whereby the rocket may be carried forward in the aircraft and placed within the tube and mated with the suitable connectors of the character hereinbefore described prior to extension thereof from the tail of the aircraft.

It is also within the scope of the instant invention either to carry the booster and float assembly beneath the surface of the aircraft tail portion but forwardly of the position from which it is launched or to provide for internally loading the booster and float from within the aircraft whereby it may be extended by structure of the general character used for retractable landing gear of land based type aircraft and which will be extended to an operative position immediately after loading thereof and prior to the time of desired take-off. Preferably a skin portion which may be in the nature of a clam shell or the like is provided to permit a streamlined configuration of the aircraft when the aircraft is in flight with a booster carried thereby. After launching of the aircraft and release either by mechanical, automatic or explosive means of the booster the retract mechanism may be withdrawn into a configuration closed by the clam shell.

Obviously many modifications and variations of the present invention are possible in the light of the above teachings. It is therefore to be understood that within the scope of the appended claims the invention may be practiced otherwise than as specifically described.

What is claimed is:

1. In combination with seaplane type aircraft of a character having aerodynamic fuselage configuration characteristics substantially similar to those of a high performance land based aircraft,
   means for reorienting the aircraft from its normal horizontally disposed position on the surface of a body of water to a nose high-tail submerged position and for providing the additional function of thrust assistance to the power plant of the aircraft during take-off, and
   means detachably coupled or detachably affixed to said last mentioned means for maintaining the aircraft in a normal position on the surface of a body of water until immediately prior to reorientation of the aircraft in anticipation of take-off thereof.

2. The structure of claim 1 further comprising in combination,
   means for providing attachment and sequential release of said first and second mentioned means respectively to and from said aircraft during take-off operation thereof.

3. The structure of the combination of claim 2, wherein
   said first mentioned means comprises a rocket booster assembly containing a propellent charge and means for remotely controlled ignition of said charge,
   said second mentioned means comprises a float assembly for counteracting the negative buoyancy characteristics of said first mentioned means, and
   said last mentioned means comprises a manually engaged automatically released coupling-disconnect device.

4. The structure of the combination of claim 3, wherein
   said last mentioned means comprises a manually engaged automatically releasable quick connect-disconnect device comprising means for completing electrical circuits through said coupling disconnect device, and
   electrically actuated means for releasing said float assembly.

5. The structure of the combination of claim 4 further characterized by the inclusion of
   electrically actuated means for actuating said rocket booster assembly.

References Cited in the file of this patent

UNITED STATES PATENTS

| 2,431,132 | Malina et al. | Nov. 18, 1947 |
| 3,072,021 | Marcon | Jan. 8, 1963 |
| 3,074,321 | Draim et al. | Jan. 22, 1963 |